(12) United States Patent
Pastor (10) Patent No.: US 12,196,852 B2
(45) Date of Patent: Jan. 14, 2025

(54) SIDESCAN SONAR TOWFISH WITH FIBER OPTIC GYROSCOPIC SENSING

(71) Applicant: FNV IP B.V., Leidschendam (NL)

(72) Inventor: Chad Pastor, Lafayette, LA (US)

(73) Assignee: FNV IP B.V., Leidschendam (NL)

( * ) Notice: Subject to any disclaimer, the term of this patent is extended or adjusted under 35 U.S.C. 154(b) by 188 days.

(21) Appl. No.: 18/086,341

(22) Filed: Dec. 21, 2022

(65) Prior Publication Data

US 2024/0210559 A1 Jun. 27, 2024

(51) Int. Cl.
*G01S 15/89* (2006.01)
*G01C 19/66* (2006.01)
*G01C 19/72* (2006.01)

(52) U.S. Cl.
CPC .......... *G01S 15/8902* (2013.01); *G01C 19/66* (2013.01); *G01C 19/72* (2013.01)

(58) Field of Classification Search
CPC ........ G01S 15/8902; G01S 7/521; G01S 7/53; G01S 7/539; G01C 19/66; G01C 19/72; G01V 1/162; G01V 1/003
See application file for complete search history.

(56) References Cited

U.S. PATENT DOCUMENTS

| | | | |
|---|---|---|---|
| 8,148,992 B2 * | 4/2012 | Kowalczyk | G01V 3/104 324/365 |
| 11,353,566 B2 * | 6/2022 | Sandretto | G01S 7/52004 |
| 11,554,840 B2 * | 1/2023 | Pastor | H04N 23/51 |
| 2008/0284441 A1 * | 11/2008 | Kowalczyk | G01V 3/104 324/334 |
| 2010/0128561 A1 * | 5/2010 | Meldahl | G01V 1/3826 367/16 |
| 2019/0331779 A1 * | 10/2019 | Sandretto | G01S 7/52004 |
| 2022/0017192 A1 * | 1/2022 | Pastor | G03B 17/566 |
| 2024/0183659 A1 * | 6/2024 | Pastor | B63B 17/0081 |
| 2024/0210171 A1 * | 6/2024 | Pastor | G01S 7/521 |
| 2024/0210559 A1 * | 6/2024 | Pastor | G01V 1/003 |

(Continued)

FOREIGN PATENT DOCUMENTS

| | | | | |
|---|---|---|---|---|
| AU | 2019397603 A1 * | 5/2021 | ............ | B63C 11/48 |
| EP | 3850428 A1 * | 7/2021 | ............ | B63C 11/48 |
| RU | 2459738 C2 * | 8/2012 | | |

(Continued)

*Primary Examiner* — Daniel Pihulic
(74) *Attorney, Agent, or Firm* — Polsinelli PC (57) ABSTRACT

Disclosed herein are systems and apparatuses for sonar acquisition using a towed platform (e.g., a towfish). A sonar acquisition towed platform apparatus can include one or more sidescan sonars coupled to a towed platform and a gyroscopic sensor array rigidly coupled to an outer surface of the towed platform. The gyroscopic sensor array can be external to the towed platform and to the one or more sidescan sonars. The gyroscopic sensor array can generate sensor information indicative of a heading of the towed platform and a roll of the towed platform. The sonar acquisition towed platform apparatus can further include a transceiver for transmitting survey information including the sensor information obtained using the gyroscopic sensor array and sidescan sonar information obtained using the one or more sidescan sonars, the sensor information corresponding to the sidescan sonar information.

20 Claims, 5 Drawing Sheets

(56) References Cited

U.S. PATENT DOCUMENTS

2024/0210588 A1* 6/2024 Pastor ..................... G01S 15/60

FOREIGN PATENT DOCUMENTS

| WO | WO-2020121227 A1 * | 6/2020 | ............. B63C 11/48 |
| WO | WO-2024120947 A1 * | 6/2024 | ............. G01C 13/00 |
| WO | WO-2024132998 A1 * | 6/2024 | ............. G01C 19/66 |
| WO | WO-2024132999 A1 * | 6/2024 | ............. G01C 13/00 |
| WO | WO-2024133000 A1 * | 6/2024 | ............. B63B 21/66 |

* cited by examiner

SIDESCAN SONAR TOWFISH WITH FIBER OPTIC GYROSCOPIC SENSING

FIELD

The present disclosure relates to an underwater surveying system and methods of use thereof. Specifically, the system includes a sidescan sonar with a fiber optic gyro mounted thereto.

BACKGROUND

Geophysical surveying often requires towing an acoustic sidescan sonar device in front of or behind a vessel to create an aerial image of the seafloor from a mosaicing process during shallow water operations. For example, one or more acoustic sidescan sonars can be provided on a platform, housing, etc., that is connected to a vessel via one or more cables or tethers. The platform or housing that includes the one or more acoustic sidescan sonars can also be referred to as a "fish" and/or as a "towfish." For example, a towfish can refer to an instrument (and/or platform or housing thereof) that is towed in front of or behind a vessel for the purpose of collecting remote sensing data. For example, a towfish can be used to collect remote sensing data of a seafloor, of a water column, of a magnetic field, and/or for communicating with various other in water deployed devices (e.g., such as autonomous underwater vehicles (AUVs), etc.), among various other uses. The mosaicing process can be used to identify, classify, and count seafloor targets of various types such as fish traps, boulders, or other geo hazards. However, using conventional towfish and conventional heading methods, such as Course Made Good (CMG), mother vessel heading, fish to mother vessel bearing, and/or magnetic-based heading devices results in poor quality mosaics that contain false information and/or representations of the seafloor targets of interest. For example, the false information can lead to duplication of target counting and low-quality positioning due to poor-quality heading data

SUMMARY

Aspects of the present disclosure include a sonar acquisition towed platform apparatus (e.g., also referred to herein as a "towfish apparatus"). The apparatus includes one or more sidescan sonars, a gyroscopic sensor array, and a transceiver. The sidescan sonars are coupled to a towed platform (e.g., a "towfish platform"). The gyroscopic sensor array can be rigidly coupled to an outer surface of the towfish platform, such that the gyroscopic sensor array is external to the towfish platform and to the sidescan sonars. The gyroscopic sensor array can generate sensor information indicative of a heading of the towfish platform and a roll of the towfish platform. The transceiver can transmit survey information, which can include the sensor information obtained using the gyroscopic sensor array and sidescan sonar information obtained using the sidescan sonars. The sensor information corresponds to the sidescan sonar information.

In certain instances, the gyroscopic sensor array can generate sensor information indicative of a pitch of the towfish platform.

In certain instances, the gyroscopic sensor array can include a fiber optic gyroscope (FOG) or a ring laser gyroscope (RLG).

In certain instances, translational degrees of freedom (DoFs) and rotational DoFs of the gyroscopic sensor array can be rigidly constrained relative to the towfish platform.

In certain instances, a housing can be rigidly and removably coupled to the towfish platform. The gyroscopic sensor array can be disposed within an interior volume of the housing. In certain instances, the gyroscopic sensor array can be rigidly affixed to an inner surface of the housing.

In certain instances, the gyroscopic sensor array can be separate from each sidescan sonar.

In certain instances, the sensor information can include multiple gyroscopic sensor measurements and the sidescan sonar information can include multiple sidescan sonar images. Each gyroscopic sensor measurement can correspond to a respective sidescan sonar image. In certain instances, each gyroscopic sensor measurement and the respective sidescan sonar image can be obtained within the same time window.

In certain instances, the sonar acquisition towfish apparatus can include a depressor wing coupled to a front end of the towfish platform. The depressor wing sheds water and exerts a downward force on the towfish platform when submerged in a body of water.

In certain instances, the gyroscopic sensor array can include multiple gyroscopic sensors. The gyroscopic sensors can include a first sensor, a second sensor, and a third sensor. The first sensor can generate measurement data indicative of a heading of the sonar acquisition towfish apparatus. The second sensor can generate measurement data indicative of a pitch of the sonar acquisition towfish apparatus. The third sensor can generate measurement data indicative of a roll of the sonar acquisition towfish apparatus. In certain instances, the gyroscopic sensor array can include one or more of an inertial measurement unit (IMU) having one or more inertial sensors or an attitude and heading reference system (AHRS) having one or more heading sensors.

In certain instances, the towfish platform can be a shallow water towfish.

In certain instances, the towfish platform can include an external mounting bracket for removably and rigidly coupling the gyroscopic sensor array to the towfish platform.

Aspects of the present disclosure include a sonar acquisition system. The system includes one or more sidescan sonars, a gyroscopic sensor array, and a transceiver. The sidescan sonars are coupled to a towfish platform. The gyroscopic sensor array can be rigidly coupled to an outer surface of the towfish platform, such that the gyroscopic sensor array is external to the towfish platform and to the sidescan sonars. The gyroscopic sensor array can generate sensor information indicative of a heading of the towfish platform and a roll of the towfish platform. The transceiver can transmit survey information, which can include the sensor information obtained using the gyroscopic sensor array and sidescan sonar information obtained using the sidescan sonars. The sensor information corresponds to the sidescan sonar information.

In certain instances, the gyroscopic sensor array can generate sensor information indicative of a pitch of the towfish platform.

In certain instances, the gyroscopic sensor array can include a fiber optic gyroscope (FOG) or a ring laser gyroscope (RLG).

In certain instances, translational degrees of freedom (DoFs) and rotational DoFs of the gyroscopic sensor array can be rigidly constrained relative to the towfish platform.

In certain instances, the sensor information can include multiple gyroscopic sensor measurements and the sidescan sonar information can include multiple sidescan sonar images. Each gyroscopic sensor measurement can correspond to a respective sidescan sonar image.

In certain instances, the towfish platform can include an external mounting bracket for removably and rigidly coupling the gyroscopic sensor array to the towfish platform.

Other advantages of the invention will become apparent from the following description taken in connection with the accompanying drawings, wherein is set forth by way of illustration and example an embodiment of the present invention.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Provided herein is a surveying apparatus for creating an aerial image of the seafloor. The apparatus can include a towfish and a fiber optic gyroscope (FOG). As used herein, the term "towfish" refers to an instrument towed (e.g., side-scan sonar, magnetometer, TransVerse Gradiometer (TVG), moving velocity profiler) behind or in front of a vessel for the purposes of collecting remote sensing data of the seafloor, water column, or earth's magnetic field or for communicating with other in-water kits (e.g., an AUV). In some aspects, the towfish is a shallow water towfish (e.g., a small size towfish).

The towfish includes a bracket and the FOG is mounted (e.g., removably coupled) to the bracket such that the towfish and the FOG are modular (e.g., interchangeable). For instance, a given towfish can be interchangeably coupled to various FOGs, via the bracket. Similarly, a given FOG can be interchangeably coupled to various towfish, via the bracket included on each towfish. For example, when an FOG fails, the inoperative FOG can be removed from the towfish and replaced with an operative FOG. Similarly, when a towfish fails, the FOG can be removed from the inoperative towfish and mounted to an operative towfish.

To conduct a survey to identify, classify, and/or count seafloor targets (e.g., fish traps, boulders, or other geohazards), the surveying apparatus is towed through the sea (e.g., submerged) behind a ship or other vessel. During the survey, the shallow water towfish collects data of the seafloor and the FOG collects true North heading data. For instance, the true North heading data may be obtained directly using the FOG and may be stored in one or more raw data files (and/or other output data files generated by the FOG). In some aspects, the true North heading data may be obtained indirectly using the FOG, for instance based on one or more data processing operations to extract the true North heading data from a raw data file or other output data file generated by the FOG. Subsequently, after the survey is complete, overlapping images (e.g., sidescan sonar images are stitched together in a mosaicing process to create the aerial image of the seafloor. During this process, the true North heading data is used to create a highly accurate image of the seafloor and targets, which provides an accurate location of the targets.

The surveying apparatus described herein may provide significant benefits over conventional towfish. For example, the apparatus can significantly increase the accuracy of seafloor images, which can improve the ability to identify, classify, and/or count seafloor targets (e.g., geohazards). The accuracy of the images results, correspondingly, in a decrease in the amount of time required to complete mosaic post-processing. Accordingly, the increased accuracy can lead to cost savings (e.g., reduction in post-processing) for the project. Moreover, accurate images of the seafloor can be produced in a shorter turnaround time (e.g., project time compression).

The apparatus can significantly improve the accuracy of seafloor images over conventional towfish. For example, conventional towfish may include a magnetic compass that provides magnetic North heading data (e.g., heading relative to magnetic North). However, the magnetic North heading data is typically not suitable for the mosaicing process used to generate a composite image from a plurality of sidescan sonar images. For example, magnetic heading data is often inaccurate and cannot be used to automatically generate the composite or mosaiced seafloor survey image. In many cases, magnetic heading data must be manually reviewed and/or corrected when performing the mosaicing process, and in some examples, the mosaicing process itself may be performed manually (e.g., such as when the magnetic heading data is poor or inaccurate).

In general, the mosaicing process can be performed based on processing the data (e.g., geospatial images) collected by the conventional towfish. Therefore, a conventional method (e.g., Course Made Good (CMG), mother vessel heading, or fish to mother vessel bearing, etc.) is used to process the data to produce mosaics (e.g., multiple geospatial images stitched together). However, due to poor-quality heading data such as that often obtained using a magnetic compass, the conventional towfish and conventional methods can result in poor quality mosaics that include false information (e.g., duplicative/double targets, low-quality positioning). In some instances, a CMG-based heading determination can be inaccurate (e.g., off) by more than 25-degrees relative to the ground truth heading. For example, CMG-based heading determinations can be inaccurate due to lateral currents causing the towfish to yaw in a previously unmeasurable manner (e.g., yawing of the towfish is ignored in the CMG-based heading determination approach)

The presently disclosed apparatus can include a fiber optic gyroscope (FOG) that provides true North heading data (e.g., heading relative to true North), which increases the accuracy of the heading data (e.g., relative to existing magnetic compass heading data, CMG-based heading determinations, etc.). In some aspects, the fiber optic gyroscope can be provided as a heading, roll, and pitch sensing system. For instance, the fiber optic gyroscope can include one or more sensors for determining heading information, one or more sensors for determining roll information, and one or more sensors for determining pitch information. In some embodiments, some (or all) of the sensors included in the FOG can be used to obtain or otherwise determine multiple different measurements (e.g., one sensor can be used to determine heading and roll information; pitch and roll information; all three of heading, pitch, and roll information; etc.).

In some aspects, when the true North heading data is used to process the data collected by the shallow water towfish (e.g., to create geospatial images using a mosaicing process), the true North heading data can be used to accurately position various targets within the geospatial images and/or the resulting mosaic(s) generated from the geospatial images. In this manner, the data from the shallow water towfish can be better correlated with multibeam, sub-bottom, seismic, and TransVerse Gradiometer (TVG) sensors. Moreover, the improved accuracy that can be obtained using the presently disclosed systems and techniques can be seen to improve a four-dimensional (4D) accuracy (e.g., a 3D accuracy as measured over time) from one year to the next related to scouring monitoring and sediment transport geo-hazards. For example, 4D analysis (and improved accuracy thereof) can be used to verify the locations of pipelines, export main power cables, and/or inter-array cables (among various others) have not moved from their corresponding locations in one or more previous surveys (e.g., in the event that the pipelines, cables, etc., are uncovered due to scouring).

In one illustrative example, the FOG can be rigidly attached, coupled, or otherwise affixed to a towfish, such that the heading information of the FOG and the heading information of the sonar transducers are the same. For instance, the FOG can be rigidly affixed to a shallow water towfish and used to obtain heading information corresponding to the shallow water towfish. The used of the rigidly affixed FOG can improve heading accuracy associated with the towfish (and/or sidescan sonar data collected using the towfish) by a magnitude of three times over the heading accuracy achieved with conventional towfish. Moreover, the heading data obtained using the rigidly affixed FOG can further be seen to be independent of magnetic effects such as geology, altitude from the seafloor, local ferrous objects, or towing distance from the vessel (e.g., each of which may be present in, and cause inaccuracies in, magnetic heading data). In some instances, the FOG can be accurate to within 0.5-degrees (e.g., the difference between the heading determined by or otherwise output by the rigidly affixed FOG and the ground truth heading can be less than 0.5-degrees). In some instances, the FOG can be accurate to within 0.3-degrees or better. In some instances, the FOG can be accurate to within 0.1-degrees or better. In this manner, the presently disclosed apparatus can be used to obtain highly accurate geospatial images, including accurate target locations.

The surveying apparatus can significantly reduce the amount of mosaicing effort (e.g., time) that is necessitated when using conventional towfish. As previously discussed, the poor-quality heading data associated with conventional towfish results in poor image quality such that, when multiple images are stitched together during the mosaicing process, false information (e.g., duplicative/double targets, low-quality positioning) appears. As a result, mosaic post-processing of sidescan sonar data (or other data collected using the towfish) conventionally requires human review of the data (e.g., quality control) and human manipulation of the data (e.g., data correction) to reconcile the false information and produce an acceptable mosaic. As a result, conventional mosaic post-processing can require a substantial amount of time and resources (both computational and human), especially in target rich seafloor areas. In some examples, the presently disclosed surveying apparatus can reduce the amount of mosaicing effort by a magnitude of at least two times over conventional towfish (e.g., the time required for the mosaicing effort with the surveying apparatus can be reduced by at least 50-percent over conventional towfish).

As mentioned previously, the presently disclosed apparatus significantly reduces the mosaic post-processing time based on an FOG being rigidly affixed to a towfish and used to obtain highly accurate true North heading data. By rigidly affixing the FOG to the towfish, the heading data of the FOG can be treated as the same as the heading of the towfish. Based on the significantly improved accuracy of the FOG heading data the accuracy of downstream operations based on the FOG heading data can correspondingly be improved as well. For instance, the systems and techniques described herein can be used to obtain more accurate target locations for targets associated with or otherwise represented within the geospatial images. Thus, when multiple images are stitched together during the mosaicing process, the presence of false information can be reduced or eliminated entirely (e.g., the resulting mosaic image is accurate) such that the data correction aspect of the mosaic post-processing is reduced or eliminated. In at least one example, the surveying apparatus disclosed herein can eliminate the data correction aspect of mosaic post-processing such that post-processing involves only data review (e.g., quality control). In this manner, the presently disclosed apparatus automates at least a portion of the workflow required by conventional systems. In some examples, post-processing that previously required ten days to complete with data from a conventional towfish can be accomplished in less than one day using the surveying apparatus disclosed herein.

Correspondingly, the surveying apparatus can significantly reduce costs of mosaic post-processing that is necessitated when using conventional towfish. Cost savings can be realized as a result of the reduction in the mosaic post-processing time, as previously discussed, and the costs associated therewith. Moreover, project time compression (e.g., shorter turnaround time for surveying projects performed using the presently disclosed towfish with rigidly affixed FOG) can be realized due to the reduction in the mosaic post-processing time, which leads to more efficient (e.g., faster) delivery of finalized data (e.g., seafloor image(s) and/or sidescan sonar mosaic(s)).

As another example of benefits over conventional towfish, the presently disclosed surveying apparatus can enable curved line surveying, while maintaining heading accuracy. Typically, curved line surveying amplifies the accuracy issues (e.g., false information) associated with a conventional towfish. However, because the presently disclosed apparatus collects accurate heading data (e.g., true North heading data obtained using the rigidly affixed FOG), curved line surveying can be performed while the data correction aspect of the mosaic post-processing can be reduced or eliminated. In at least one example, post-processing involves only data review (e.g., quality control) because data correction (e.g., human manipulation of the data) is not necessary. In some examples, targets may be out-of-line by approximately 5 to 6 meters in a mosaic image generated using a conventional towfish and conventional heading determination techniques, while the same targets in an improved mosaic image generated using the systems and techniques described herein can be within 20 centimeters (e.g., out-of-line by 20 centimeters or less). Additionally, the presently disclosed apparatus can require less survey lines, which can translate into less post-processing and interpretation time, thereby speeding up the final deliverables. Additionally, the presently disclosed apparatus can enable surveying through smaller corridors, which can lead to project cost savings and project time compression.

As another example of benefits over conventional towfish, the presently disclosed surveying apparatus can be modular, such that the rigidly affixed FOG and the corresponding towfish for receiving the rigidly affixed FOG are interchangeable (e.g., modular) with respect to one another. For instance, the FOG can be externally mounted to the shallow water towfish, such that multiple FOGs and/or multiple towfish are interchangeable. Thus, if either the FOG or the towfish becomes inoperative (e.g., fails), the respective inoperative FOG or towfish can be removed and replaced with an operative FOG or towfish. Although the FOG does not include moving parts and, as a result, has no predicted life limitation, a FOG may fail over time. Therefore, the modular ability to replace a failed FOG is desirable. Conventional towfish, on the other hand, include an internal magnetic compass, which may not be interchangeable.

Figure 1:
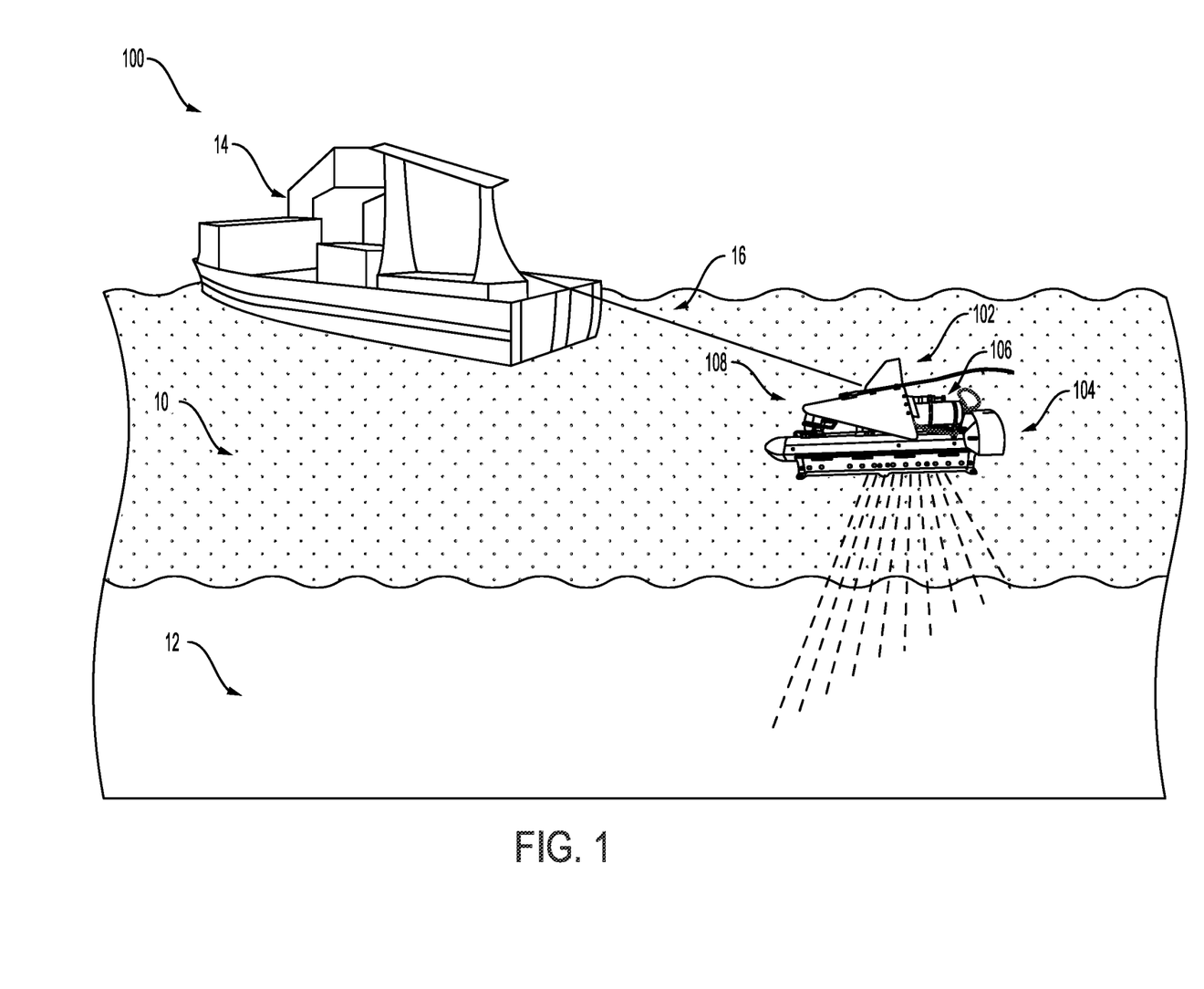
FIG. 1 illustrates a perspective view of an imaging system, including a towed apparatus connected to a vessel with a tow cable, according to an exemplary embodiment.

FIG. 1 illustrates a perspective view of an imaging system 100 for performing geophysical surveying or other marine search operations in a body of water 10 (e.g., an ocean or sea, lake, etc.). The system 100 includes a vessel 14 (e.g., boat, towing vessel, towing vehicle), a towing cable 16, and a towed apparatus 102. To deploy the towed apparatus 102 to perform a survey, one end of the towing cable 16 is connected (e.g., removably coupled) to the vessel 14 and the opposite end of the towing cable 16 is connected (e.g., removably coupled) to the towed apparatus 102. Subsequently, the towed apparatus 102 can be lowered into the body of water 10 and the vessel 14 is advanced such that the vessel 14 tows the towed apparatus 102 through the body of water 10 (e.g., with the towed apparatus 102 submerged within the body of water 10 during the towed operation). In other words, the towed apparatus 102 can be connected to the towing cable 16, which extends outward from the vessel 14 to the towed apparatus 102, such that the vessel 14 and towed apparatus 102 are moved in.

In one illustrative example, the towed apparatus 102 can be provided as a towfish (e.g., as described above). In some aspects, the towed apparatus 102 can be a sidescan sonar towfish, in which case the towed apparatus 102 can include a sidescan sonar device 104 and at least one gyroscopic sensor array 106 mounted thereto. In some embodiments, the towed apparatus 102 can include a depressor wing 108, which sheds water from the front of the towed apparatus 102 (e.g., sheds water from the end of the towed apparatus 102 that is closest to the vessel 14). The depressor wing 108 can additionally exert a downward force (e.g., away from the surface of the body of water 10, towards the seafloor 12) on the towed apparatus 102 as the towed apparatus 102 advances (e.g., is towed) through the body of water 10.

As the towed apparatus 102 advances (e.g., towed by the vessel 14), the sidescan sonar device 104 can collect data (e.g., to create geospatial images, sidescan sonar mosaics, etc.) of the seafloor 12. Simultaneously, or otherwise in conjunction with the data collection performed using sidescan sonar device 104, the gyroscopic sensor array 106 can collect movement and/or heading data (e.g., true North heading data). Subsequently, the sidescan sonar data and the gyroscopic heading data can be jointly processed (e.g., in a mosaicing process) to generate a mosaic sidescan sonar image of the seafloor 12. For instance, multiple geospatial images obtained using the sidescan sonar device 104 can be accurately stitched together (e.g., mosaiced) based on the true North heading data obtained using the gyroscopic sensor array 106. In this manner, the towed apparatus 102 can be used to produce an accurate aerial image of the seafloor 12, which can be used to accurately identify, classify, and/or count targets (e.g., geohazards, fish traps, boulders) on the seafloor 12.

Figure 2:
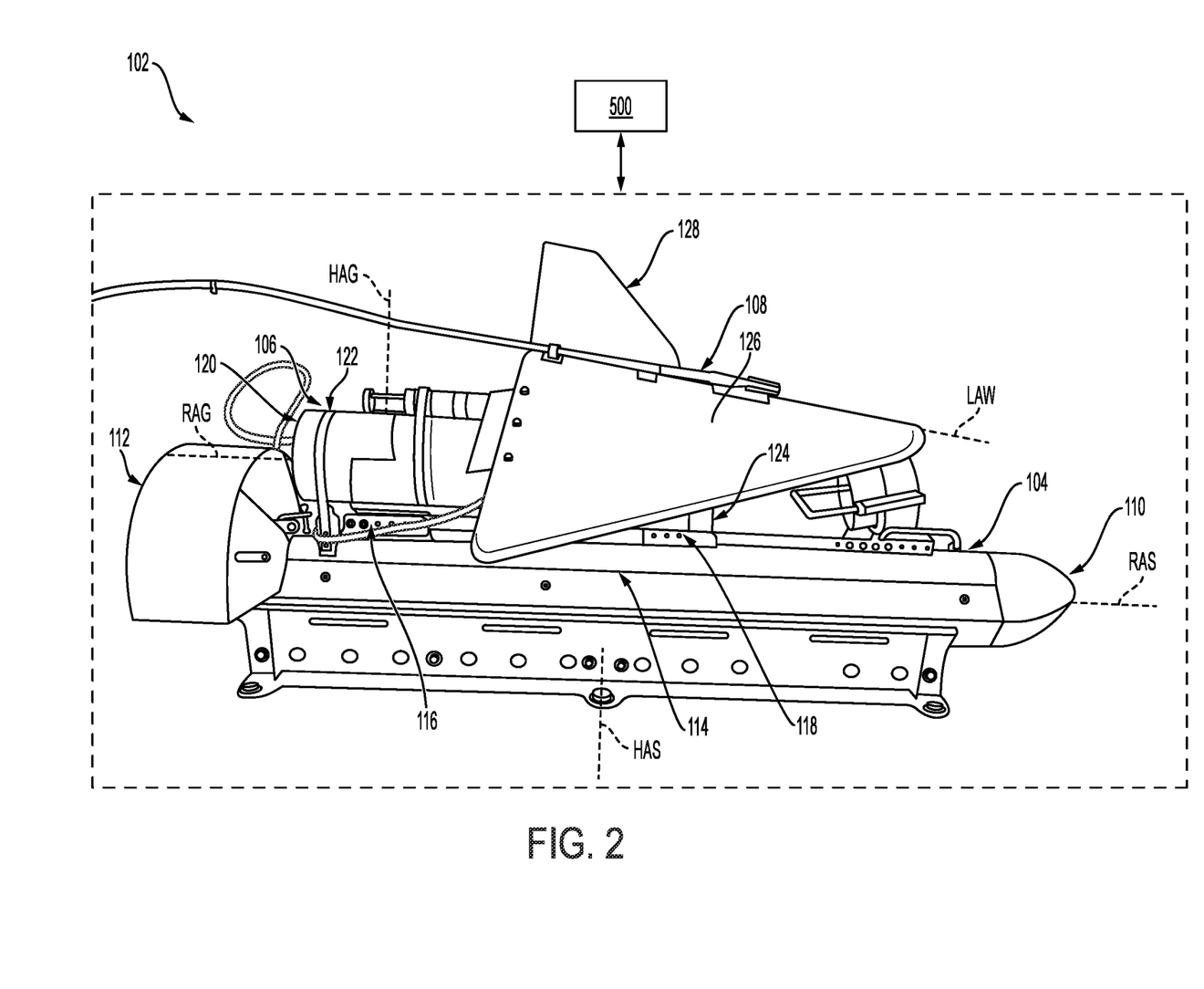
FIG. 2 illustrates a side view of the towed apparatus according to an exemplary embodiment.
Figure 3:
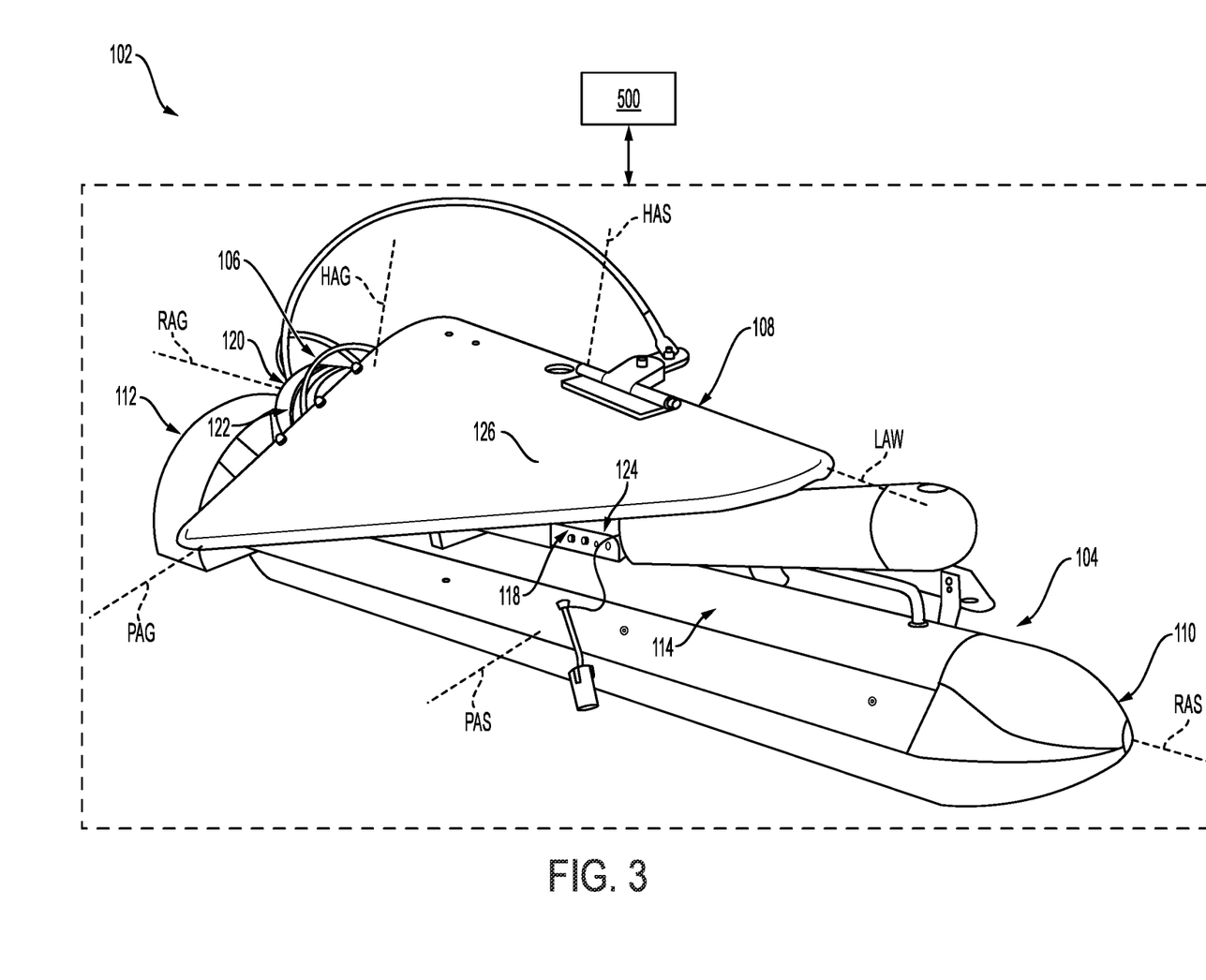
FIG. 3 illustrates a front perspective view of the towed apparatus according to an exemplary embodiment.
Figure 4:
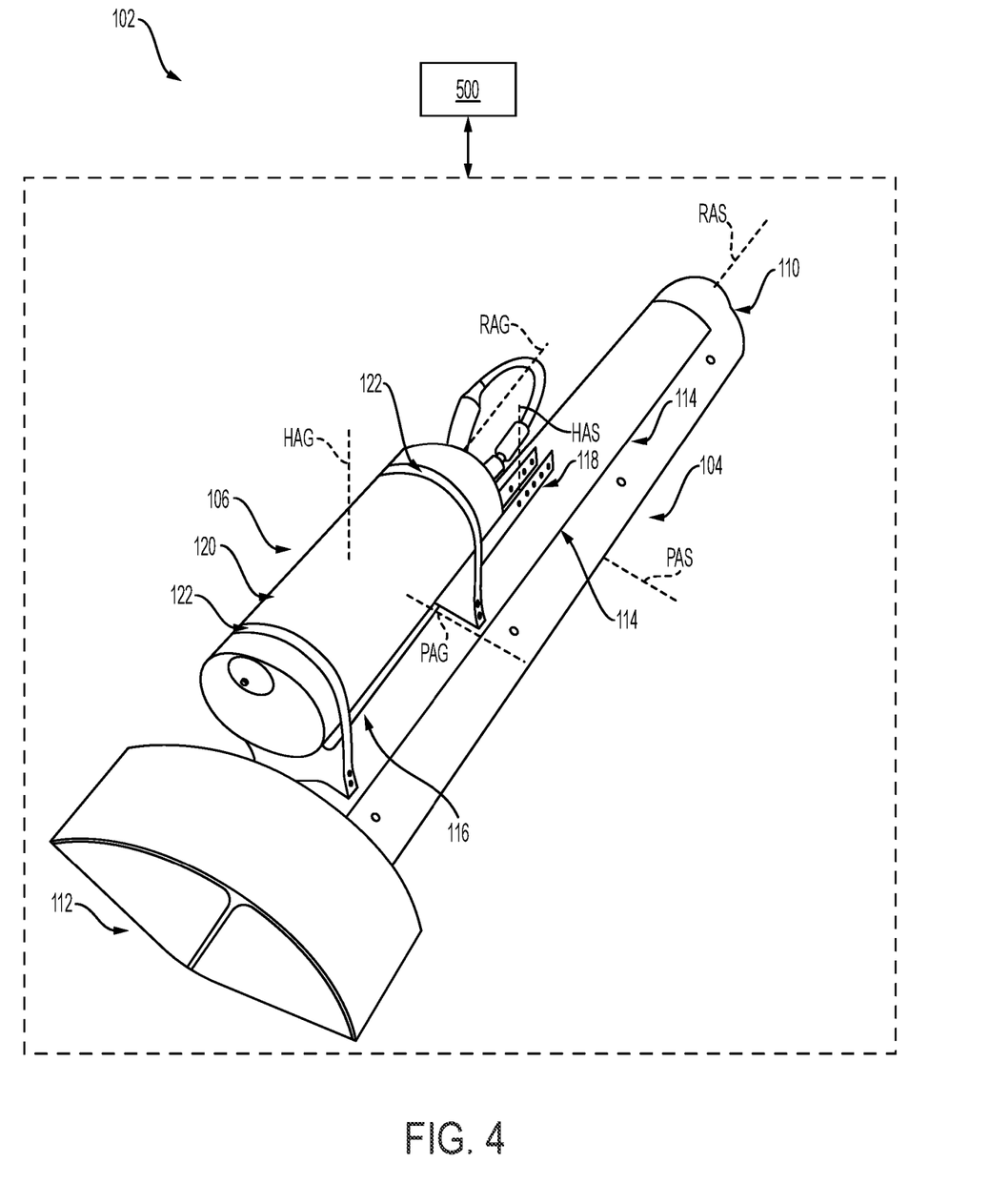
FIG. 4 illustrates a back perspective view of the towed apparatus according to an exemplary embodiment.

FIGS. 2-4 illustrate a side view, forward perspective view, and rear perspective view, respectively, of the towed apparatus 102 (e.g., also referred to as a "fish" or "towfish") according to exemplary embodiments. As discussed previously, the towed apparatus 102 includes a sidescan sonar device 104 and a gyroscopic sensor array 106 mounted thereto. In some embodiments, as illustrated for example in FIGS. 2-3, the towed apparatus 102 can include a depressor wing 108. As the towed apparatus 102 is towed behind a vessel 14 to perform a survey, as illustrated for example in FIG. 1, the towed apparatus 102 can collect data (e.g., geospatial images and/or sidescan sonar images of the seafloor 14, true North heading data).

Figure 5:
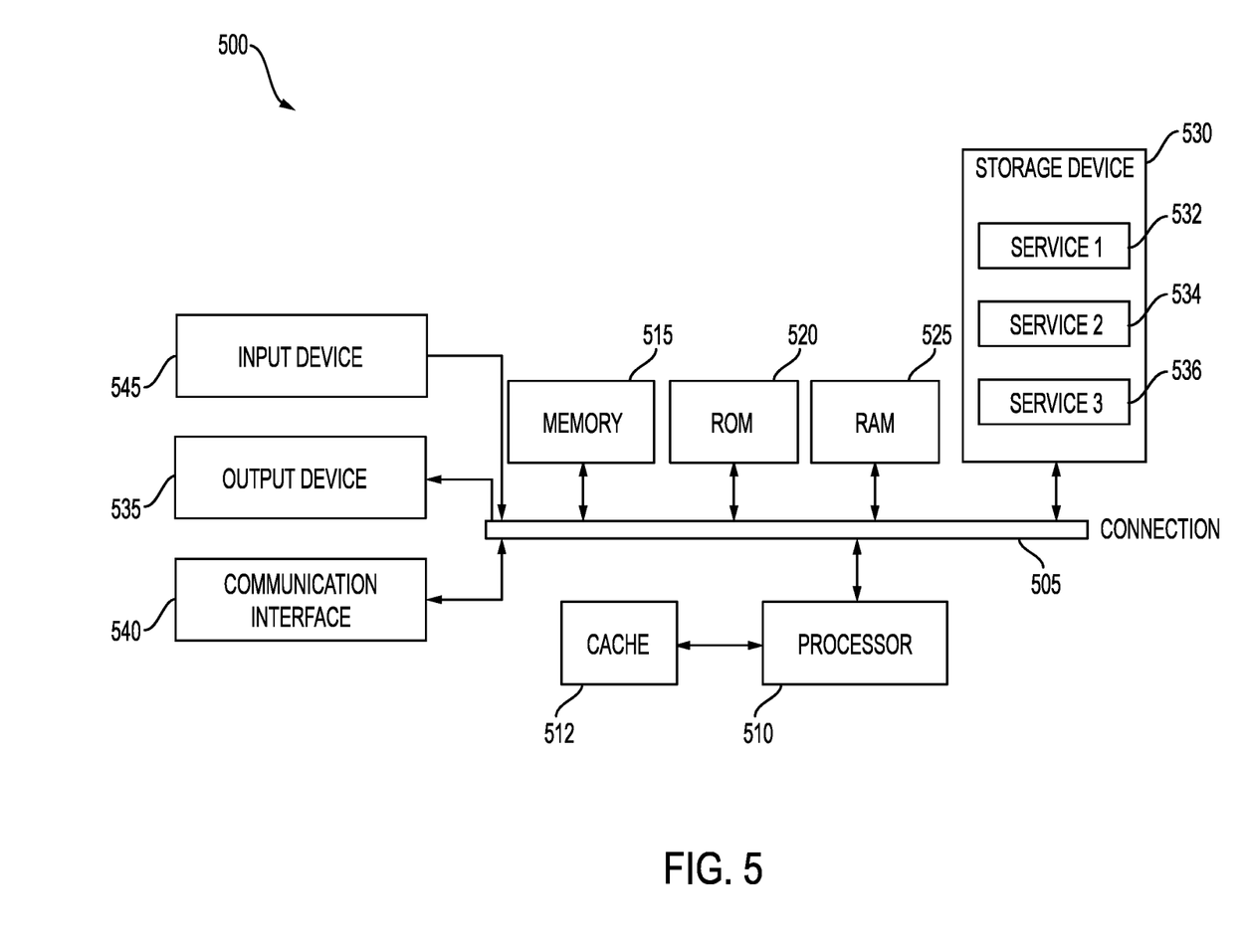
FIG. 5 is a block diagram illustrating an example of a computing system for implementing certain aspects described herein.

The disclosure turns now to the sidescan sonar device 104. As illustrated in FIGS. 2-4, the sidescan sonar device 104 can be configured to collect data (e.g., geospatial images) of the seafloor during a survey, during which time the towed apparatus 102 (and therefore sidescan sonar device 104) is submerged in a body of water 10 and towed behind a vessel 14. The sidescan sonar device 104 can be communicatively coupled to one or more data acquisition and/or data processing systems, which in one illustrative example can use the output data captured by sidescan sonar device 104 to generate mosaic sidescan sonar images of the seafloor. In some aspects, the sidescan sonar device 104 can be communicatively coupled to a computing system 500, as illustrated in FIG. 5 and discussed in greater depth below, such that the sidescan sonar device 104 can send data to the computing system 500 for one or more post-processing operations In some aspects, computing system 500 can be used to implement a data acquisition engine, a data processing engine, a mosaic processing engine, etc., as will also be described in greater depth below. For example, the sidescan sonar device 104 can include multiple sensors (e.g., provided via one or more transducer arrays) that emit sonar pulses (e.g., acoustic pulses) downward and measure the reflected pulse in order to image the seafloor (or other target of interest). For instance, the sensors included in sidescan sonar device 104 can receive and record (e.g., cross-track slices) the reflection (e.g., intensity) of the transmitted pulses off of the seafloor. The measured reflection data (e.g., the measured reflections of the transmitted sonar pulses) can be provided to a mosaicing engine (e.g., for instance implemented using the computing system 500 of FIG. 5). During a mosaicing process performed by the mosaicing engine, multiple cross-track slices can be stitched together to create an aerial image (e.g., mosaic) of the seafloor imaged by the sidescan sonar device 104.

As illustrated in FIGS. 2-4, the sidescan sonar device 104 can have a leading end 110 and a tail end 112 (which can include a tail cone), which can be oriented along a longitudinal axis of the sidescan sonar device 104. A housing 114 defines an internal compartment that houses internal electronics of the sidescan sonar device 104. In some embodiments, the sidescan sonar device 104 can include an internal, magnetic compass (e.g., in addition to the gyroscopic sensor array 106 that is rigidly coupled to the sidescan sonar device 104). In some examples, the sidescan sonar device 104 can be constructed of stainless steel, although various other constructions may also be utilized without departing from the scope of the present disclosure. In some embodiments, the sidescan sonar device 104 can be designed for shallow water operations. In some cases, sidescan sonar devices (e.g., sidescan sonar device 104) that are designed for shallow water operations may be relatively small devices, such that it is not feasible to mount a gyroscopic sensor array 106 inside a sidescan sonar device 104 designed for shallow water operation.

The sidescan sonar device 104 can include a longitudinal axis (also referred to as the roll axis RAS of the sidescan sonar device 104, as depicted in FIGS. 2-4), a transverse axis (also referred to as the pitch axis PAS of the sidescan sonar device 104, as depicted in FIGS. 2-4), and a normal axis (also referred to as the heading axis HAS of the sidescan sonar device 104, as depicted in FIGS. 2-4). The roll axis RAS and the pitch axis PAS are perpendicular to each other and are co-planar. The heading axis HAS is perpendicular to both the roll axis RAS and the pitch axis PAS.

A bracket 116 can be used to rigidly mount the gyroscopic sensor 106, via a removable (e.g., modular) coupling mechanism. In some examples, the bracket 116 can extend from a surface (e.g., top surface) of the sidescan sonar device 104. The bracket 116 can be laser-aligned with the sidescan sonar device 104 (e.g., mounted to the sidescan device 104 via a laser-alignment process) such that the bracket 116 is precisely positioned on the sidescan sonar device 104. For instance, the bracket 116 can be laser aligned to within 0.5-degrees of the sidescan sonar port and the starboard transducers. Based on the laser-alignment of the bracket 116 to the sidescan sonar device 104, the relative position of a gyroscopic sensor array 106 (e.g., coupled to the bracket 116) can be known with high accuracy with respect to the physical dimensions of the sidescan sonar device 104. In this manner, the gyroscopic sensor array 106 can be used to obtain highly accurate heading information for the sidescan sonar device 104 (e.g., accurate to within 0.5-degrees from the ground truth heading information of the sidescan sonar device 104). Moreover, because the bracket 116 is precisely positioned, the gyroscopic sensor array 106 can be modular (e.g., interchangeable) among one or more sidescan sonar devices 104.

In some embodiments, the bracket 116 includes two or more rails each having two or more apertures extending therethrough. The apertures can receive fasteners (e.g., bolts), which are used to removably couple the gyroscopic sensor array 106 to the sidescan sonar device 104. The bracket 116 provides rigidity, such that when the gyroscopic sensor array 106 is mounted to the sidescan sonar device 104, the gyroscopic sensor array 106 does not move (e.g., does not translate, does not rotate, etc.) relative to the sidescan sonar device 104. In one illustrative example, bracket 116 can be used to rigidly couple the gyroscopic sensor array 106 to the sidescan sonar device 104 in all three translation dimensions/directions and in all three rotation dimensions/directions. Additionally, as noted previously, the bracket 116 can provide a coupling mechanism that permits modularity among different sidescan sonar devices 104 and gyroscopic sensor arrays 106 that are configured for use with the bracket 116 (e.g., such as sidescan sonar devices 104 that include the bracket 116 and gyroscopic sensor arrays 106 that are configured for rigidly coupling to the bracket 116).

In some aspects, a second bracket 118, for mounting the depressor wing 108 to the sidescan sonar device 104, can extend from a surface (e.g., top surface) of the sidescan sonar device 104. In some embodiments, the second bracket 118 includes two or more rails each having two or more apertures extending therethrough. The apertures provided on the rails of the second bracket 118 can receive fasteners (e.g., bolts), which are used to removably couple The disclosure turns next to the gyroscopic sensor array 106, for example as depicted in FIG. 2 and FIG. 4. In one illustrative example, the gyroscopic sensor array 106 can be rigidly mounted to the sidescan sonar device 104 (e.g., via a rigid and removable coupling provided by the bracket 116) and configured to collect data (e.g., heading data of the towed apparatus 102) during towed survey operations. The gyroscopic sensor array 106 can be communicatively coupled to one or more data acquisition and/or data processing engines, which can be implemented based on the computing system architecture 500 depicted in FIG. 5 and described in greater depth below. In one illustrative example, the data acquisition and/or data processing engines communicatively coupled to the gyroscopic sensor array 106 can be the same as those communicatively coupled to the sidescan sonar device 104. For instance, the data acquisition and/or data processing engines can jointly process the sidescan sonar data (from sidescan sonar device 104) and the gyroscopic heading information (from gyroscopic sensor array 106) to thereby generate improved accuracy mosaic sidescan sonar images of the seafloor.

In some embodiments, the gyroscopic sensor array 106 can include or otherwise be associated with a housing 120 (e.g., enclosure). For instance, the gyroscopic sensor array 106 can be contained in (e.g., provided within an interior volume of) the housing 120. In some embodiments, the gyroscopic sensor array 106 can be aligned with the housing 120 (e.g., a laser alignment process can be used to guide the installation of gyroscopic sensor array 106 within the interior volume of housing 120). Accordingly, aligning the housing 120 with the sidescan sonar device 104 (e.g., as described above), can also serve to align the gyroscopic sensor array 106 with the sidescan sonar device 104, by virtue of the gyroscopic sensor array 106 having been previously aligned with the housing 120.

In some aspects, the gyroscopic sensor array 106 can include one or more gyroscopic sensors. For instance, the gyroscopic sensor array 106 can include one or more gyroscopic sensors provided as one or more internal gyroscopes. In one illustrative example, the gyroscopic sensor array 106 can collect at least heading information (e.g., true North), roll information, and pitch information. In some cases, the gyroscopic sensor array 106 can additionally collect inertial information. For example, the gyroscopic sensor array 106 may include one or more gyroscopic sensors for obtaining heading, pitch, and roll information, and may include one or more inertial measurement units (IMUs) for obtaining inertial or movement information. In some embodiments, the towed apparatus 102 can include a digital selector to select between collecting heading data from the magnetic internal compass of the sidescan sonar device 104 (e.g., magnetic North heading data) or from the externally mounted gyroscopic sensor array 106 (e.g., true North heading data).

In some aspects, the gyroscopic sensor array 106 gyroscope can be provided as a fiber-optic gyroscope (FOG) or can otherwise include one or more fiber-optic gyroscopes (FOGs). In some embodiments, the gyroscopic sensor array 106 can include an attitude and heading reference system (AHRS), which can provide true heading, roll, pitch, yaw, rates of turn and acceleration even in highly volatile environments. In some examples, an FOG can be an AHRS, and vice versa. In some examples, the AHRS includes an on-board processing system, which can provide attitude and heading information in real time. In some embodiments, the gyroscopic sensor array 106 does not collect positioning data. In some embodiments, the gyroscopic sensor array 106 does not include an inertial measurement unit (IMU). In some embodiments, the gyroscopic sensor array 106 can additionally, or alternatively, include a ring laser gyroscope (RLG). For example, the gyroscopic sensor array 106 can include one or more of an FOG or a ring laser gyroscope (RLG). An RLG can include a ring laser having two independent counter-propagating resonant modes over a same or shared path. A difference in phase between the two independent counter-propagating resonant modes over the same or shared path can be used to detect one or more rotations of the RLG. In some examples, the one or more detected rotations of the RLG can be used to determine heading information associated with a gyroscopic sensor array 106 that includes the RLG.

The gyroscopic sensor array 106 can include a longitudinal axis (also referred to as the roll axis RAG of the gyroscopic sensor array 106, as depicted in FIGS. 2 and 4), a transverse axis (also referred to as the pitch axis PAG of the gyroscopic sensor array 106, as depicted in FIGS. 2 and 4), and a normal axis (also referred to as the heading axis HAG of the gyroscopic sensor array 106, as depicted in FIGS. 2 and 4). The roll axis RAG and the pitch axis PAG are perpendicular to each other and are co-planar. The heading axis HAG is perpendicular to both the roll axis RAG and the pitch axis PAG.

In one illustrative example, the gyroscopic sensor array 106 can be externally mounted (e.g., removably coupled) to the sidescan sonar device 104. For instance, during installation, the gyroscopic sensor array 106 can be laser-aligned with the sidescan sonar device 104 (e.g., mounted to the sidescan sonar device 104 via a laser-alignment process) such that the gyroscopic sensor array 106 is precisely positioned on the sidescan sonar device 104. For instance, based on the laser-alignment of the gyroscopic sensor 106 (and/or housing 120 thereof) to the sidescan sonar device 104, the relative position of the gyroscopic sensor array 106 with respect to the sidescan sonar device 104 can be known with high accuracy. In this manner, the gyroscopic sensor array 106 can be used to obtain highly accurate heading information of the sidescan sonar device 104 (e.g., accurate to within 0.5-degrees of the ground truth heading information of the sidescan sonar device 104). In some embodiments, the gyroscopic sensor array 106 can include a fault sensor (e.g., provided within the housing 120 of the gyroscopic sensor array 106), which can trigger a fault code if the gyroscopic sensor array 106 (e.g., housing 120) is not aligned within a pre-determined tolerance (e.g., the aforementioned accuracy of 0.5-degrees).

In some embodiments, one or more straps 122 (e.g., clamps) can be used to removably and rigidly couple the gyroscopic sensor array 106 to the sidescan sonar device 104. The one or more straps 122 can be wrapped around a portion of the circumference of the housing 120 of the gyroscopic sensor array 106 and attached with a fastener (e.g., screw) to the bracket 116 of the sidescan sonar device 104. In one illustrative example, when the gyroscopic sensor array 106 is mounted to the sidescan sonar device 104, the gyroscopic sensor array 106 is rigidly affixed to the sidescan sonar device 104, such that the gyroscopic sensor array 106 does not move (e.g., does not translate, does not rotate) relative to the sidescan sonar device 104 even when external forces are applied (e.g., as the towed apparatus 102 is moved through a body of water during a towed surveying operation). In some embodiments, the gyroscopic sensor array 106 is rigidly affixed to an outer surface (e.g., top surface) of the sidescan sonar device 104. In some embodiments, the gyroscopic sensor is rigidly affixed to an inner volume of the housing 120 (e.g., enclosure) and the housing 120 is rigidly affixed to the outer surface of the sidescan sonar device 104.

When the gyroscopic sensor array 106 is mounted to the sidescan sonar device 104, the heading axis HAG of the gyroscopic sensor array 106 can be parallel to the heading axis HAS of the sidescan sonar device 104. Similarly, the roll axis RAG of the gyroscopic sensor array 106 can be parallel to the roll axis RAS of the sidescan sonar device 104. Finally, the pitch axis PAG of the gyroscopic sensor array 106 can be parallel to the pitch axis PAS of the sidescan sonar device 104.

Because the gyroscopic sensor array 106 is rigidly affixed to the sidescan sonar device 104, the axes of the gyroscopic sensor array 106 (e.g., heading axis HAG, roll axis RAG, pitch axis PAG) are inhibited from moving (e.g., translating, rotating) with respect to the axes of the sidescan sonar device 104 (e.g., heading axis HAS, roll axis RAS, pitch axis PAS) when external forces are applied (e.g., when the towed apparatus 102 is advanced through a body of water, such as when performing a towed survey). In other words, as the towed apparatus 102 is advanced through the body of water, the heading axis HAG of the gyroscopic sensor array 106 remains parallel to the heading axis HAS of the sidescan sonar device 104. Similarly, the roll axis RAG of the gyroscopic sensor array 106 remains parallel to the roll axis RAS of the sidescan sonar device 104. Finally, the pitch axis PAG of the gyroscopic sensor array 106 remains parallel to the pitch axis PAS of the sidescan sonar device 104.

Because the gyroscopic sensor array 106 is removably coupled to the sidescan sonar device 104, the towed apparatus 102 is modular (e.g., a given sidescan sonar device 104 can be compatible with various different gyroscopic sensor arrays 106 in an interchangeable manner, and vice versa). In other words, the sidescan sonar device 104 and/or the gyroscopic sensor array 106 can be removed and replaced (e.g., swapped), via the bracket 116 previously described above. For example, the sidescan sonar device 104 or the gyroscopic sensor array 106 can be removed (e.g., decoupled from the rigid affixation between the two) when the respective sidescan sonar device 104 or gyroscopic senor array 106 is at or near the end of its service life and replaced with new or newer components. In one example, when a sidescan sonar device 104 fails, an operative gyroscopic sensor array 106 can be removed from the inoperative sidescan sonar device 104. Then, the operative gyroscopic sensor array 106 can be mounted to an operative (e.g., new or different) sidescan sonar device 104. In another example, when a gyroscopic sensor array 106 fails, the inoperative gyroscopic sensor array 106 can be removed from the operative sidescan sonar device 104. Then, an operative (e.g., new or different) gyroscopic sensor array 106 can be mounted to the operative sidescan sonar device 104.

Turning now to the depressor wing 108, as illustrated in FIGS. 2-3, the depressor wing 108 can be mounted (e.g., removably coupled) to the sidescan sonar device 104 and configured to exert a downward force on the apparatus 102 as it advances (e.g., is towed) through the body of water. For example, the depressor wing 108 can include a plate 124 with one or more apertures therethrough. The apertures of the plate 124 of the depressor wing 108 can be aligned with the apertures of the bracket 118 of the sidescan sonar device 104 and a fastener (e.g., bolt) can be advanced through the apertures to removably couple the depressor wing 108 to the sidescan sonar device 104. In some examples, the depressor wing 108 can be constructed of fiberglass.

The depressor wing 108 defines a longitudinal axis LAW, which, when the depressor wing 108 is mounted to the towed apparatus 102, is coplanar with both the roll axis RAS of the sidescan sonar device 104 and the roll axis RAG of the gyroscopic sensor array 106. The depressor wing 108 can include two members that each define a planar surface 126. Additionally, the depressor wing 108 can include a fin 128, as illustrated for example in FIG. 2, which extends vertically upward from the depressor wing 108. The fin 128 can be aligned (e.g., coplanar) with the longitudinal axis LAW of the depressor wing 108.

The longitudinal axis of the depressor wing 108 can define a wing angle, which is measured with respect to the angle between the longitudinal axis of the depressor wing 108 and either the roll axis RAS of the sidescan sonar device 104 or the roll axis RAG of the gyroscopic sensor array 106. The wing angle can be, for example, between 0-degrees and approximately 10-degrees. For example, the wing angle can be approximately 0-degrees, 1-degree, 2-degrees, 3-degrees, 4-degrees, 5-degrees, 6-degrees, 7-degrees, 8-degrees, 9-degrees, or 10-degrees. When the towed apparatus 102 is towed through the water, the depressor wing 108 sheds water from the front of the towed apparatus 102 (e.g., the end of the towed apparatus 102 that is nearest to the tow vessel). Additionally, the depressor wing 108 exerts a downward force on the towed apparatus 102 such that the towed apparatus 102 is towed at a greater depth (e.g., a greater submerged depth relative to the surface of the body of water). In other words, the depressor wing 108 can cause the towed apparatus 102 to be positioned, while under tow, at a location more vertically downward and less horizontally rearward relative to the tow vessel as compared to the location at which the towed apparatus 102 would otherwise stabilize in the absence of depressor wing 108 (e.g., due to tow speed, current, etc.).

Turning now to the computing system 500, as illustrated for example in FIGS. 2-4, the computing system 500 can be communicatively coupled to the towed apparatus 102 such that the computing system 500 can receive data from the sidescan sonar device 104 and the gyroscopic sensor array 106. In some embodiments, a wired connection can be provided between the computing system 500 and the towed apparatus 102 (e.g., between the computing system 500, and the sidescan sonar device 104 and the gyroscopic sensor array 106). For instance, the wired connection can be carried via one or more communication cables provided on or otherwise attached to the tether connected the towed apparatus 102 to the tow vessel. In some embodiments, a wireless connection can additionally, or alternatively, be utilized for communications between the computing system 500 and the towed apparatus 102 (e.g., between the computing system 500, and the sidescan sonar device 104 and the gyroscopic sensor array 106). The communication link(s) can be unidirectional or bidirectional. In some aspects, after receiving data from the towed apparatus 102 (e.g., from sidescan sonar device 104 and/or gyroscopic sensor array 106), the computing system 500 can log the data. Subsequently, the computing system 500 can perform one or more mosaicing processes to jointly process the sidescan sonar data (sidescan sonar images from sidescan sonar device 104) with the heading information (e.g., FOG heading information from the gyroscopic sensor array 106). The mosaicing process(es) can be implemented by the computing system 500 to generate one or more composite (e.g., mosaiced) aerial images of the seafloor, as imaged by the sidescan sonar data. In particular, the highly accurate heading, roll, and pitch of the sidescan sonar device 104 can be determined from the gyroscopic information obtained by gyroscopic sensor array 106 and can be used to automatically guide the mosaicing process of aligning the separate sidescan sonar images (e.g., "tiles") obtained by the sidescan sonar device 104 at different times and corresponding to different physical locations/scan areas.

In some embodiments, the computing system 500 can receive data from the gyroscopic sensor array 106 that includes heading data (e.g., rotation about heading axis HAG), roll data (e.g., rotation about roll axis RAG), and pitch data (e.g., rotation about pitch axis PAG). The computing system 500 can process the data received from the gyroscopic sensor array 106 to determine the heading, roll, and pitch of the sidescan sonar device 104 (e.g., rotation about heading axis HAS, rotation about roll axis RAS, and rotation about pitch axis PAS) during the survey. In some embodiments, the computing system 500 can convert inertial measurement unit (IMU) measurements to attitude and heading reference system (AHRS) heading, roll and pitch. In some embodiments, the computing system 500 can be incorporated on board with the gyroscopic sensor array 500. The computing system 500 can include an on-board processing system, which provides attitude and heading information in real time. The pitch information can be used in the sidescan mosaicing process to improve the final image. Roll and pitch can be calculated from one or more additional sensors.

FIG. 5 illustrates a computing system architecture, according to some embodiments of the present disclosure. Components of computing system architecture 500 are in electrical communication with each other using a connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A sonar acquisition towed platform apparatus, comprising:
   one or more sidescan sonars coupled to a towed platform;
   a gyroscopic sensor array rigidly coupled to an outer surface of the towed platform, wherein the gyroscopic sensor array is external to the towed platform and to the one or more sidescan sonars, and generates sensor information indicative of a heading of the towed platform and a roll of the towed platform; and
   a transceiver for transmitting survey information, the survey information including the sensor information obtained using the gyroscopic sensor array and sidescan sonar information obtained using the one or more sidescan sonars, the sensor information corresponding to the sidescan sonar information.

2. The sonar acquisition towed platform apparatus of claim 1, wherein the gyroscopic sensor array generates sensor information further indicative of a pitch of the towed platform.

3. The sonar acquisition towed platform apparatus of claim 1, wherein the gyroscopic sensor array comprises one or more of a fiber optic gyroscope (FOG) or a ring laser gyroscope (RLG).

4. The sonar acquisition towed platform apparatus of claim 1, wherein translational degrees of freedom (DoFs) and rotational DoFs of the gyroscopic sensor array are rigidly constrained relative to the towed platform.

5. The sonar acquisition towed platform apparatus of claim 1, wherein:
   the gyroscopic sensor array is disposed within an interior volume of a housing; and
   the housing is rigidly and removably coupled to the towed platform.

6. The sonar acquisition towed platform apparatus of claim 5, wherein the gyroscopic sensor array is rigidly affixed to an inner surface of the housing.

7. The sonar acquisition towed platform apparatus of claim 1, wherein the gyroscopic sensor array is separate from each sidescan sonar of the one or more sidescan sonars.

8. The sonar acquisition towed platform apparatus of claim 1, wherein:
   the sensor information includes a plurality of gyroscopic sensor measurements;
   the sidescan sonar information includes a plurality of sidescan sonar images; and
   each gyroscopic sensor measurement of the plurality of gyroscopic sensor measurements corresponds to a respective sidescan sonar image of the plurality of sidescan sonar images.

9. The sonar acquisition towed platform apparatus of claim 8, wherein each gyroscopic sensor measurement and the respective sidescan sonar image are obtained within a same time window.

10. The sonar acquisition towed platform apparatus of claim 1, further comprising a depressor wing coupled to a front end of the towed platform, wherein the depressor wing sheds water and exerts a downward force on the towed platform when submerged in a body of water.

11. The sonar acquisition towed platform apparatus of claim 1, wherein the gyroscopic sensor array comprises a plurality of gyroscopic sensors, the plurality of gyroscopic sensors including:
   a first sensor generating measurement data indicative of a heading of the sonar acquisition towed platform apparatus;
   a second sensor generating measurement data indicative of a pitch of the sonar acquisition towed platform apparatus; and
   a third sensor generating measurement data indicative of a roll of the sonar acquisition towed platform apparatus.

12. The sonar acquisition towed platform apparatus of claim 11, wherein the gyroscopic sensor array further includes one or more of an inertial measurement unit (IMU) having one or more inertial sensors or an attitude and heading reference system (AHRS) having one or more heading sensors.

13. The sonar acquisition towed platform apparatus of claim 1, wherein the towed platform is a shallow water towfish.

14. The sonar acquisition towed platform apparatus of claim 1, wherein the towed platform further includes an external mounting bracket for removably and rigidly coupling the gyroscopic sensor array to the towed platform.

15. A sonar acquisition system, comprising:
   one or more sidescan sonars coupled to a towed platform;
   a gyroscopic sensor array rigidly coupled to an outer surface of the towed platform, wherein the gyroscopic sensor array is external to the towed platform and to the one or more sidescan sonars, and generates sensor information indicative of a heading of the towed platform and a roll of the towed platform; and
   a transceiver for transmitting survey information, the survey information including the sensor information obtained using the gyroscopic sensor array and sidescan sonar information obtained using the one or more sidescan sonars, the sensor information corresponding to the sidescan sonar information.

16. The sonar acquisition system of claim 15, wherein the gyroscopic sensor array further generates sensor information indicative of a pitch of the towed platform.

17. The sonar acquisition system of claim 15, wherein the gyroscopic sensor array comprises a fiber optic gyroscope (FOG) or a ring laser gyroscope (RLG).

18. The sonar acquisition system of claim 15, wherein translational degrees of freedom (DoFs) and rotational DoFs of the gyroscopic sensor array are rigidly constrained relative to the towed platform.

19. The sonar acquisition system of claim 15, wherein:
   the sensor information includes a plurality of gyroscopic sensor measurements;
   the sidescan sonar information includes a plurality of sidescan sonar images; and
   each gyroscopic sensor measurement of the plurality of gyroscopic sensor measurements corresponds to a respective sidescan sonar image of the plurality of sidescan sonar images.

20. The sonar acquisition system of claim 15, wherein the towed platform further includes an external mounting bracket for removably and rigidly coupling the gyroscopic sensor array to the towed platform.

* * * * *